United States Patent [19]

Kitchens

[11] Patent Number: 4,550,220

[45] Date of Patent: Oct. 29, 1985

[54] SPLICE INSULATOR ASSEMBLY

[75] Inventor: Roy A. Kitchens, Pikeroad, Ala.

[73] Assignee: National Industries, Inc., Montgomery, Ala.

[21] Appl. No.: 549,251

[22] Filed: Nov. 4, 1983

[51] Int. Cl.[4] ...................... H01R 4/70; H02G 15/113

[52] U.S. Cl. .................................. 174/138 F; 174/92

[58] Field of Search ............ 174/76, 84 C, 92, 138 F; 138/149, 128, 162, 166, 168

[56] References Cited

U.S. PATENT DOCUMENTS

| | | | |
|---|---|---|---|
| 3,138,657 | 6/1964 | Wengen | 174/92 |
| 3,244,802 | 4/1966 | Sturtevant et al. | 277/178 X |
| 3,519,728 | 7/1970 | Gillemot | 174/76 |
| 3,638,286 | 2/1972 | Eichberg | 138/128 X |
| 3,757,031 | 9/1973 | Izraeli | 174/138 F |

FOREIGN PATENT DOCUMENTS

| | | | |
|---|---|---|---|
| 722632 | 11/1965 | Canada | 138/149 |
| 1239377 | 7/1960 | France | 174/92 |
| 309698 | 3/1969 | Sweden | 138/149 |
| 1297944 | 11/1972 | United Kingdom | 174/92 |

*Primary Examiner*—Laramie E. Askin

*Attorney, Agent, or Firm*—Watts, Hoffmann, Fisher & Heinke

[57] ABSTRACT

An insulator for covering a splice connection joining multiple exposed conductors. The insulator has an inner foam core and an outer plastic cover which together form an elongated sleeve that fits over the splice. The cover is flexed from an open position where the sleeve fits over the splice to a closed position where two interlocking edges extending along the length of the sleeve mate to hold the insulator in place. In combination, the core and cover prevent dust and moisture from reaching the splice and also prevent exposed conductor strands at the splice from coming in contact with other circuit portions.

3 Claims, 6 Drawing Figures

SPLICE INSULATOR ASSEMBLY

DESCRIPTION

1. Technical Field

The invention relates to an insulator for covering exposed portions of a splice junction connecting two or more conductors.

2. Background Art

Splices in electrical wiring assemblies are commonly used in constructing complex circuits. In an automotive wiring assembly, for example, one assembly may have twelve to fifteen splices with common grounds going to a multitude of lamp sockets, switches, and junction boxes. A single switch closure may light a number of lights as well as energize a number of solenoids so both the lights and solenoids must be spliced to the switch. As the circuitry becomes more complex and as more automobile options become available, splices become more prevalent.

A splice is accomplished by stripping the insulation from the ends of a number of wires and crimping a splice band around the bare wires. It is a good practice to make sure that the wire's copper strands extend all the way through the splice band since wires that do not extend through the splice band may inadvertently be pulled from the band. If the copper strands protrude all the way through the splice band, then the end portions of the strands that are not subjected to the compressive forces of the splice band push out in various directions and resist pulling as the wiring harness is moved or flexed.

A common method to insulate a splice is by wrapping the splice with a dielectric tape. Unfortunately, tape is subject to puncturing by strands extending beyond the splice band. These strands may contact adjacent circuits or conductive parts of the assembly causing a short circuit.

An alternative to wrapping the splice with tape is to injection mold a flexible material around the splice. In the case of complex assemblies, however, moving the assembly harness to an injection molding machine becomes costly and impractical. Another disadvantage of molding is the fact that the mass of material is high since there is no way to ensure complete insulation with a small diameter mold. An oversize mold is typically used, resulting in coverage beyond that needed to insulate the splice. This is costly, adds to the weight of the assembly, and adds to the bundle size which should be kept to a minimum. In a production setting, moving hundreds of circuit assemblies to a molding machine or a group of molding machines to mold the various bundle sizes becomes totally impractical.

SUMMARY OF THE INVENTION

Practice of the present invention allows splices in a wiring harness to be insulated without moving the harness to a separate location. Rather, a fabricated insulator is snapped over each splice where the splicing occurs.

The insulator includes an elongated foam inner core member for isolating the connection and a plastic outer cover to hold the inner core member in place. The cover is initially shaped to form an open elongated recess and can be closed about the splice. Two longitudinal edges interlock to hold the inner core in tight engagement about the electrical connection. The combination of foam core and cover cannot be pierced by sharp wire strands extending from the splice.

A preferred foam core member is an elongated cylinder of closed cell foam split along its length to define a V-shaped gap. When the insulator is over a splice, flat opposed surfaces of the "V" engage the splice and isolate the conductors leading to the splice from contact with any other circuit portions. The preferred cover is an elongated plastic sheath which bounds the outside of the core member and is flexible so that the sheath can be bent from an open condition that receives the splice to a closed condition with the core encasing the splice.

The core and outer cover are adhesively bonded together so that flexing of the outer cover opens and closes the inner core. The flat core surfaces are treated with an adhesive layer that bonds the core to the splice as well as bonding the opposed flat surfaces to each other when the core is closed about the splice.

The cover's longitudinal edges define interlocking hooks and grooves extending longitudinally along the length of the sheath that hold the cover and attached core tightly in place about the electrical connection.

One size insulator can insulate various size wires because the flat surfaces of the core member yield to accommodate different size splices. The core and cover can also be fabricated in varying diameters to accommodate an even greater variety in wire sizes.

From the above it should be appreciated that one feature of the invention is that the insulator is inexpensive, easily applied, yet reliable for insulating spliced interconnections in a wiring circuit. This and other features and advantages of the invention will become better understood from the detailed description of a preferred embodiment of the invention, which is described in conjunction with the accompanying drawings.

BEST MODE FOR CARRYING OUT THE INVENTION

Figure 1:
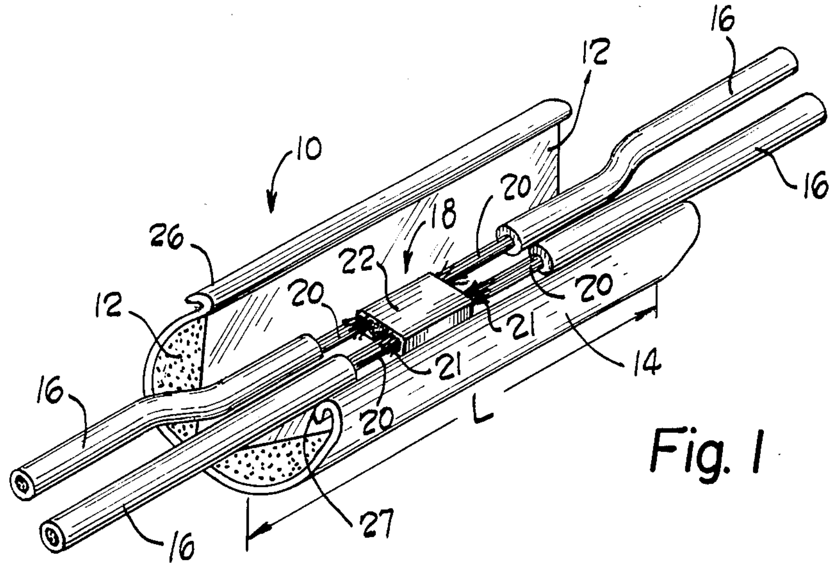
FIG. 1 is a perspective view of an insulator constructed in accordance with the present invention, shown open but having been placed about a wiring splice to be insulated.
Figure 2:
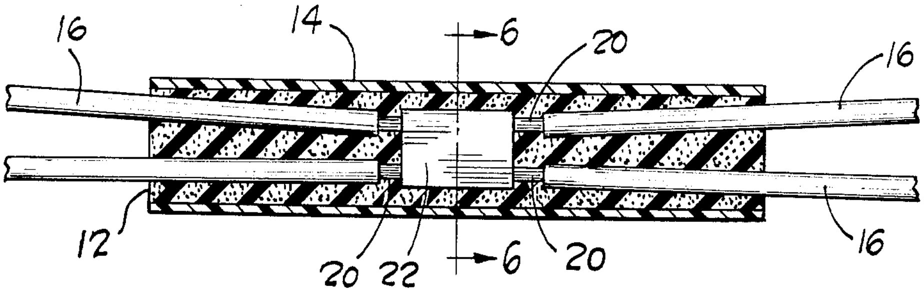
FIG. 2 is a longitudinal sectional view of the insulator of FIG. 1 with parts in elevation showing the insulator closed about a splice connection.

With reference to the drawings, FIG. 1 shows an insulator 10 having an inner foam core 12 and an outer cover 14. The insulator 10 is shown positioned about multiple insulated wires 16 spliced together at a junction or splice connection 18.

Insulation is stripped away from the wires 16 so that exposed metal conductors 20 can be bound together by a metal band 22. The conductors 20 are made of many smaller diameter metal strands 21 that extend completely through the metal band 22. Pressure from the band causes these strands 21 to extend outwardly away from the junction 18 in a multitude of directions.

It is the purpose of the insulator 10 to completely insulate the exposed conductors 20, the metal band 22 and the individual wire strands 21. To insulate the junction 18, the user centers the band 22 within the length L of the insulator 10 and bends or flexes the cover 14 until two interlockable edge portions 26, 27 extending the length of the cover 14 engage each other and secure the inner foam core 12 about any exposed metal at the junction 18. When locked in place, (FIG. 6) the insulator 10 blocks dust and moisture from reaching the junction 18 and guarantees that the sharp strands 21 of exposed metal are insulated against contact with anything electrically conductive.

Figure 3:
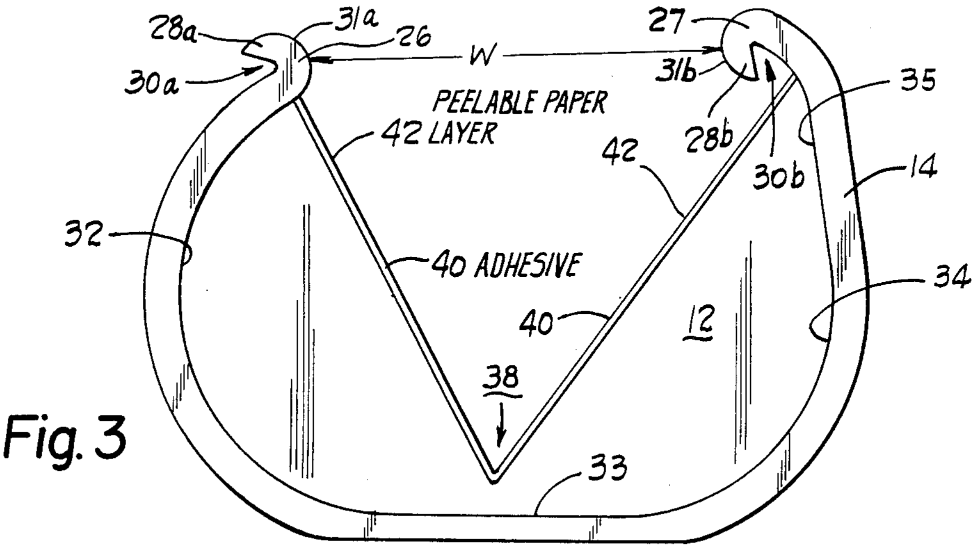
FIG. 3 is an end elevational view of the insulator of FIG. 1 in an open condition.
Figure 6:
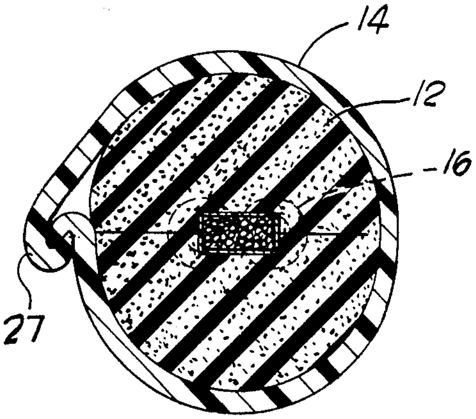
FIG. 6 is a transverse sectional view of the insulator of FIG. 2 taken along the line 6—6 showing the insulator positioned about a splice.

The outer cover 14 is preferably extruded or injection molded from a plastic material which in a preferred embodiment of the invention is nylon. The cover 14 is a generally trough-like sheath somewhat U-shaped in cross-section, (FIG. 3) circumferentially large enough to receive the core 12 and to surround a splice junction, and long enough to cover the stripped portion of conductors 20. Use of a nylon material allows the cover 14 to resist melting under high heat (over 120° F.) yet bend or flex so the cover can be closed about the junction and locked in place (FIG. 6).

The interlockable edge portions 26, 27 define hooks *28a, 28b* and grooves *30a, b* which lock together with an audible snap. As the cover 14 is flexed and bent toward the position shown in FIG. 6, outer surfaces *31a, b* of the two hooks *28a, b* contact each other. Further bending of the cover causes the two hooks *28a, b* to overlap and a restoring force of the flexed cover 14 snaps each hook into the groove of the other edge portion.

Figure 4:
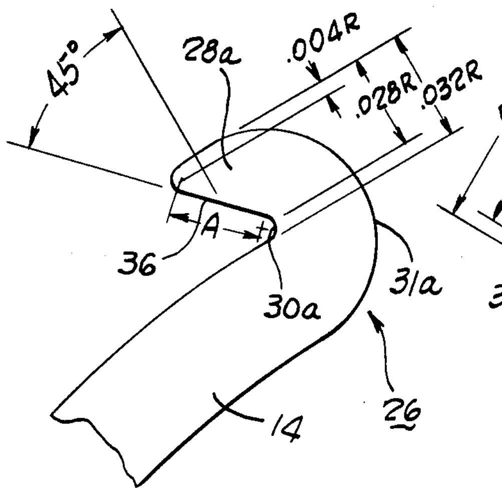
FIGS. 4 and 5 are enlarged partial end elevational views of two engageable edges of the insulator which couple together to retain the insulator in a closed condition.
Figure 5:
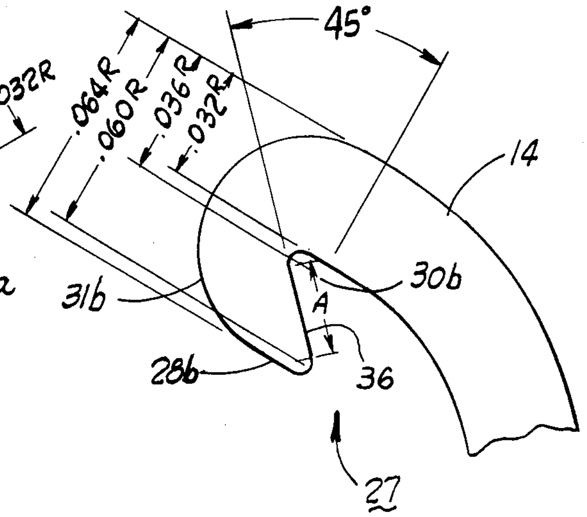

While the edge portions 26, 27 are similar, they open in opposite directions so that when locked in place, one edge 27 overlies the second edge 26. As seen in FIGS. 4 and 5, a length A along an inner flat surface 36 of the hooks *28a, 28b* is the same for each edge and an angle subtended oy the hook (45°) is the same as the angle of the gap or groove.

The cover's shape allows use of a semi-rigid material, such as nylon, since severe bending need not be performed to lock the insulator 10 around the splice. In an open condition the spacing W between the two edges 26, 27 is less than the diameter of the insulator 10. The shape of the cover 14 and position of the edges 26,27 is such that squeezing together of the cover 14 brings the outer surfaces *31a, 31b* into contact.

The restoring force of the flexed plastic cover holds the core 12 in tight engagement with the splice but is not so great that the user cannot manually disengage the edges and re-open the insulator if necessary. The cover 14 experiences elastic rather that plastic deformation. This type of deformation gives the nylon cover 14 a memory since it remembers its opened equilibrium configuration.

Between the two edges 26, 27 the flexed cover 14 (FIG. 3) defines four different surfaces 32–35 with different radii of curvature. A first surface 32 is the circumferentially longest of the four and is bordered by an essentially flat surface 33 opposite the gap between the edges 26, 27. Next, a second curved surface 34 circumferentially shorter than the first 32 connects the first flat surface 33 with a short flat surface 35 next to the edge 27.

The core member 12 is made from a neoprene closed cell foam which fits inside the rounded portions of the cover 14. This foam core 12 is held in place by an adhesive material between the inner surface of the cover 14 and rounded outer surfaces of the foam core 12. With the insulator 10 opened (FIG. 3) the core 12 defines a "V" into which the junction 18 is pushed. As the cover 14 is closed, the "V" closes about and ultimately surrounds the junction (see FIG. 6).

There are two alternative procedures for forming the insulator. In accordance with a preferred procedure, the cover 14 is extruded utilizing a die of an appropriate dimension to produce the cover shown in FIG. 3. A rope or cylinder of core material is split through approximately 80 percent of its diameter with a rotary slicing knife. The core is then inserted into the open cover after a hot melt adhesive such as polyethylene oxide is sprayed inside the cover 14. This adhesive is then heat cured and a guillotine type knife is used to cut the assembled length insulator 10 into short segments to form insulators 10 of an appropriate length L. A preferred adhesive is sold under the trademark Noryl by the General Electric Company.

In a second fabrication process both the core 12 and cover 14 are co-extruded from separate dies. The cover is first extruded and then an adhesive material is dispensed inside an inner surface of the cover so that the core 12 can be extruded downstream from the first die. In this second embodiment, the splitting process is not needed since the second die is shaped to provide a notch or "V" in the closed-cell foam core.

In either embodiment, two flat surfaces 40 of the core 12 are covered with an adhesive material so that when the cover is closed about the junction, the opposing surfaces 40 of the core 12 adhere to each other as well as to any exposed metal at the junction. This adhesive layer may be covered with two thin pieces of paper 42 or the like which can be peeled away from the surfaces 40 prior to use.

If the insulator 10 is used at room temperature or lower, other materials may be substituted for the nylon cover. In particular, polypropylene may be used. In this event, the cover is much more flexible and can be more readily opened and closed by the user. It should be appreciated that although the invention has been described with particularity, modifications can be made therein without departing from the spirit and scope of the invention set forth in the appended claims.

I claim:

1. A splice insulator for covering exposed metal conductors in an electric connection comprising:

an elongated core member of flexible closed cell foam split down its middle to define two flat surfaces to engage and insulate an electric connection; and a flexible outer plastic sheath attached to said core member for holding said core member in place, said sheath being capable of being flexed between an open position with said two flat surfaces of said core member separated to accommodate the electrical connection and a closed position where said two flat surfaces engage and surround the electrical connection, said sheath having two longitudinally extending edges which define a tongue and groove connector that locks said sheath in said closed position about said core member causing the flat surfaces to engage an electrical connection placed between the flat surfaces, said core member and said sheath being adhesively bonded to each other with said sheath conforming to exterior portions of said core member and said longitudinally extending edges bordering the flat surfaces of the core member.

2. The splice insulator of claim 1 wherein said flat surfaces of said core member have an adhesive coating that seals the core member about an electrical connection when the sheath is in a locked position.

3. An insulator for covering exposed metal conductors at a splice connection comprising:

a flexible cover member made from a dielectric material having a longitudinal slit which can be flexed from an open trough-defining shape to a closed cylindrical-like shape where two elongated edges bounding said slit contact each other, said dielectric material having an equilibrium shape such that when said cover member is flexed, said edges contact each other; and an elongated resilient compressible dielectric liner affixed to the inside of said cover member and having a longitudinal recess into which a splice connection is to be inserted with the cover member open, the liner recess having a sufficient depth and the cover member and liner having a sufficient transverse length to encircle a splice connection;

said two elongated edges defining interengageable tongue and groove connectors which mate as the cover member is closed about a splice connection with a first tongue contacting and sliding along an outside surface of a second tongue until said first tongue rides over said outside surface and snaps into a groove radially inward of said second tongue, said liner having an adhesive surface along the recess so that when a splice connection is inserted and the cover is closed about the splice connection, the splice connection is sealingly surrounded by the liner.

* * * * *